(12) United States Patent
Bernard et al.

(10) Patent No.: US 7,570,468 B2
(45) Date of Patent: Aug. 4, 2009

(54) NOISE IMMUNE RC TRIGGER FOR ESD PROTECTION

(75) Inventors: David Bernard, Aix en Provence (FR); Antoine Riviere, Pourcieux (FR)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 11/759,337

(22) Filed: Jun. 7, 2007

(65) Prior Publication Data

US 2008/0007882 A1    Jan. 10, 2008

Related U.S. Application Data

(60) Provisional application No. 60/806,608, filed on Jul. 5, 2006.

(51) Int. Cl.
*H02H 9/00* (2006.01)

(52) U.S. Cl. ....................... 361/56

(58) Field of Classification Search ............ 361/56
See application file for complete search history.

(56) References Cited

U.S. PATENT DOCUMENTS

| | | | |
|---|---|---|---|
| 5,946,177 A | 8/1999 | Miller et al. | |
| 6,249,410 B1 * | 6/2001 | Ker et al. | 361/56 |
| 6,621,680 B1 | 9/2003 | Segervall | |
| 6,828,766 B2 | 12/2004 | Corva et al. | |
| 6,891,495 B2 | 5/2005 | Chen et al. | |
| 6,972,939 B1 | 12/2005 | Ho et al. | |
| 7,102,862 B1 * | 9/2006 | Lien et al. | 361/56 |
| 7,295,411 B2 * | 11/2007 | Arai et al. | 361/56 |
| 2004/0257728 A1 | 12/2004 | Hu | |

OTHER PUBLICATIONS

T. Maloney et al., "Novel Clamp Circuits for IC Power Supply Protection," IEEE Transactions-Part C, vol. 19, No. 3, Jul. 1996, pp. 150-161.

* cited by examiner

*Primary Examiner*—Stephen W Jackson
*Assistant Examiner*—Ann T Hoang
(74) *Attorney, Agent, or Firm*—Schwegman, Lundberg & Woessner P.A.

(57) ABSTRACT

An ESD protection circuit incorporates an ESD shunt device triggered by an ESD trigger network. In non-powered situations, a first RC time constant in the ESD trigger network, corresponds with the time range of the onset an ESD event and controls application of the ESD shunt device in response to the ESD event. A second RC time constant in a shunt trigger network is selected to be longer than the first RC time constant and holds-off triggering of a shunt device during ESD shunt protection. When activated during powered-on operation, the shunt device shunts a resistive element in the ESD trigger network forming a third time constant. The shunt device guards against false triggering during noise on a power rail by maintaining the third time constant in the ESD trigger network. The third time constant ensures that power rail voltage buildup due to noise dissipates before a false trigger develops.

41 Claims, 5 Drawing Sheets

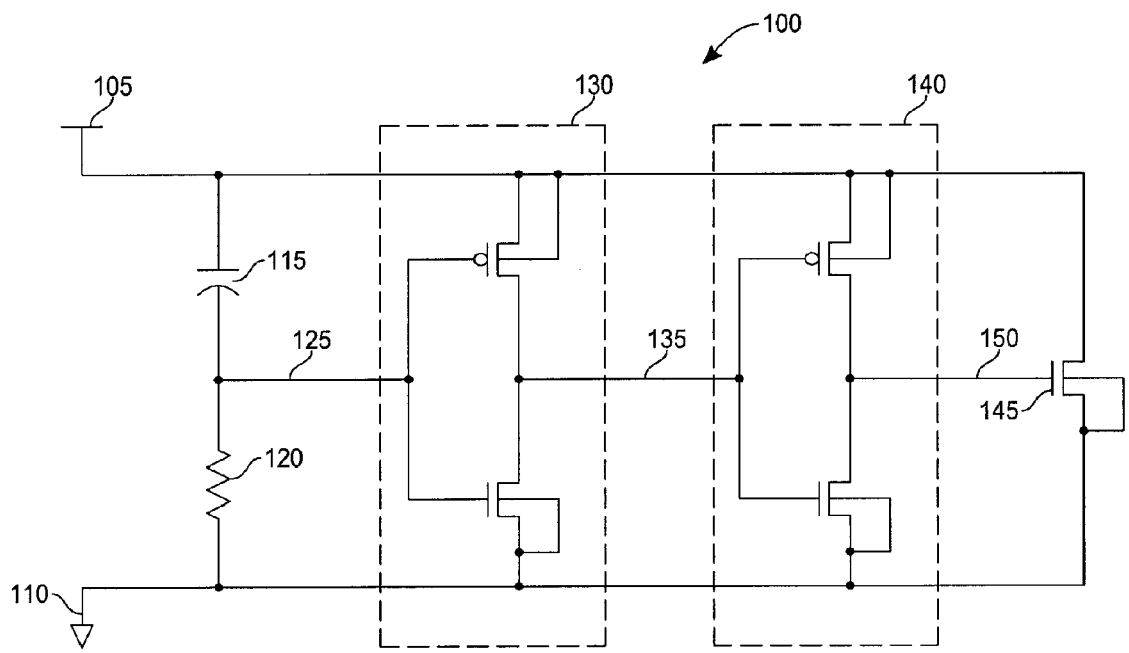
Fig. 1 *(Prior Art)*
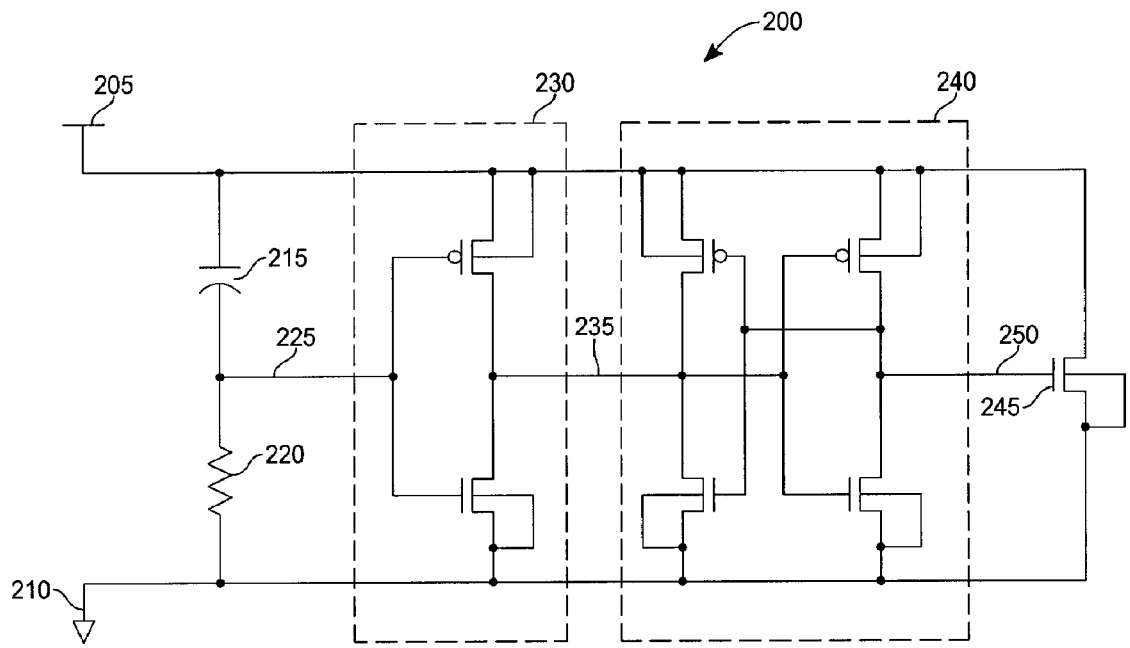
Fig. 2 *(Prior Art)*

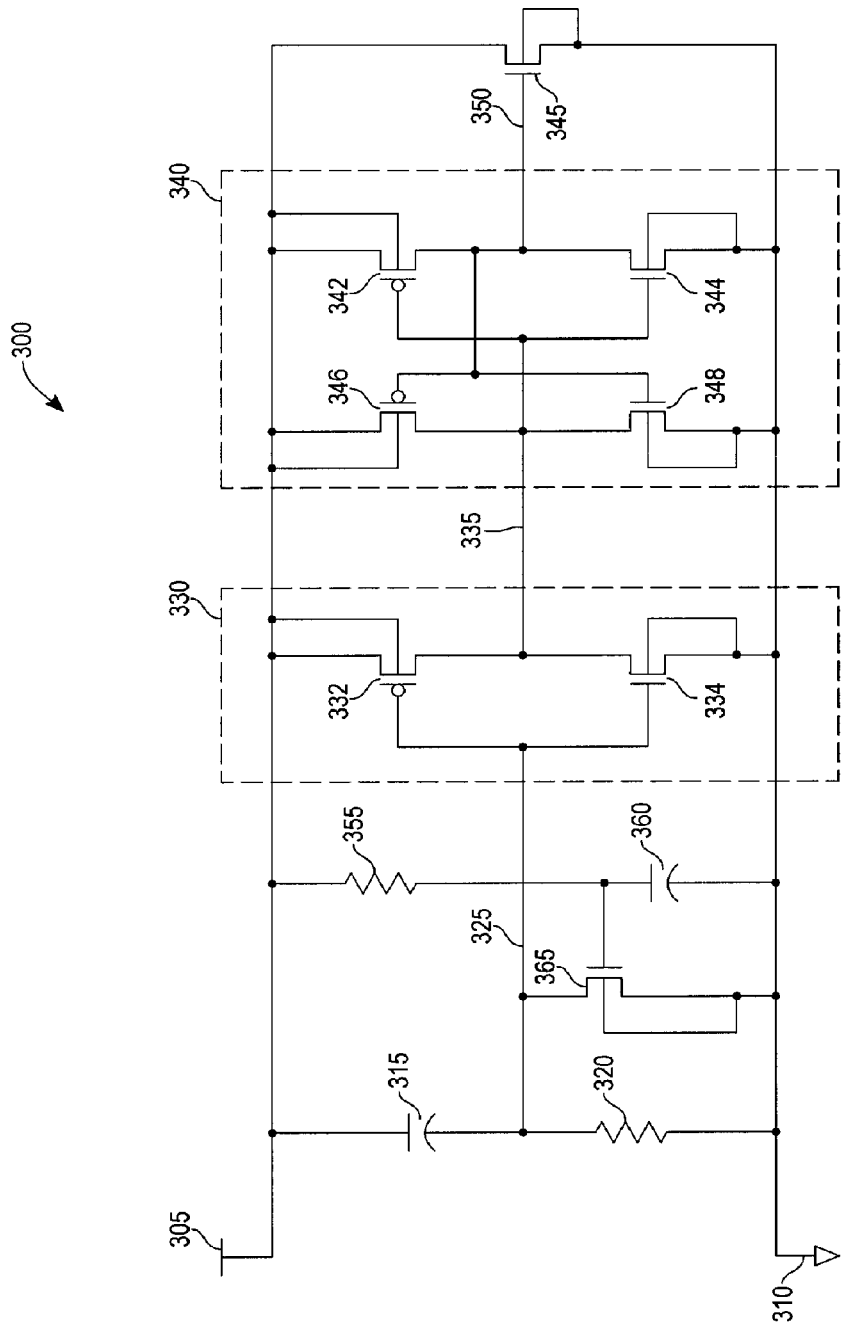
Fig._3

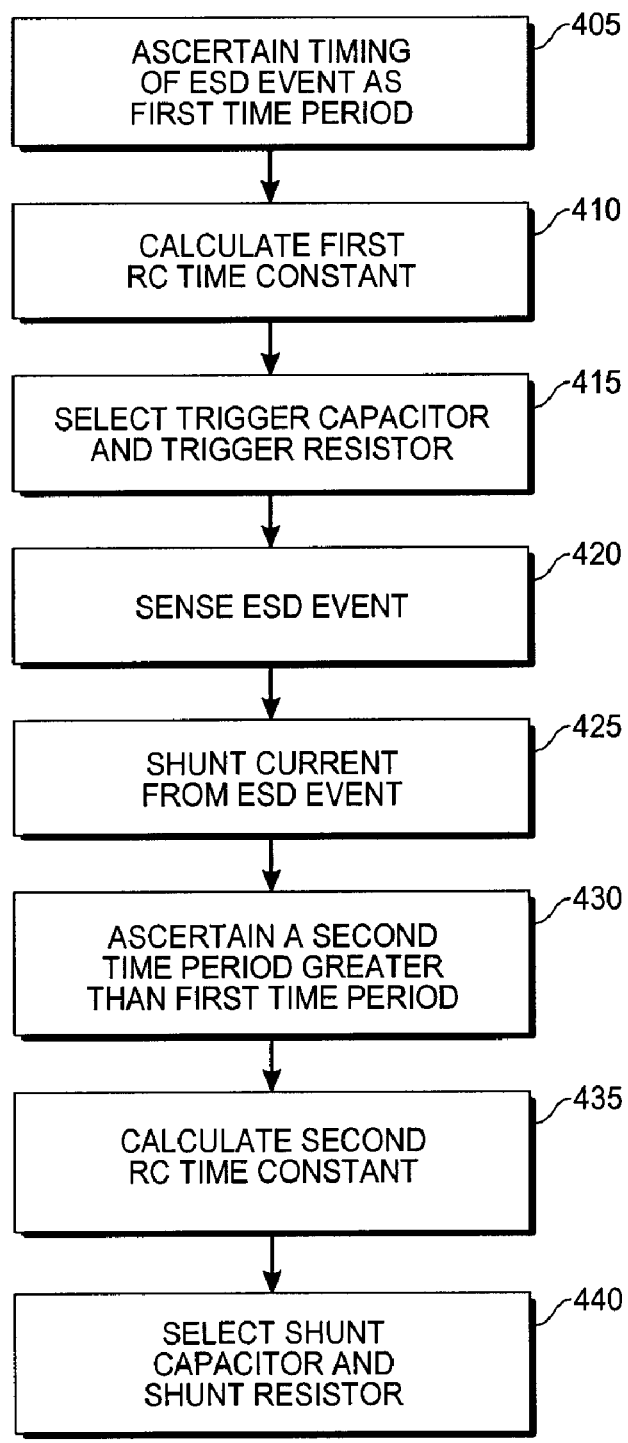
Fig._4

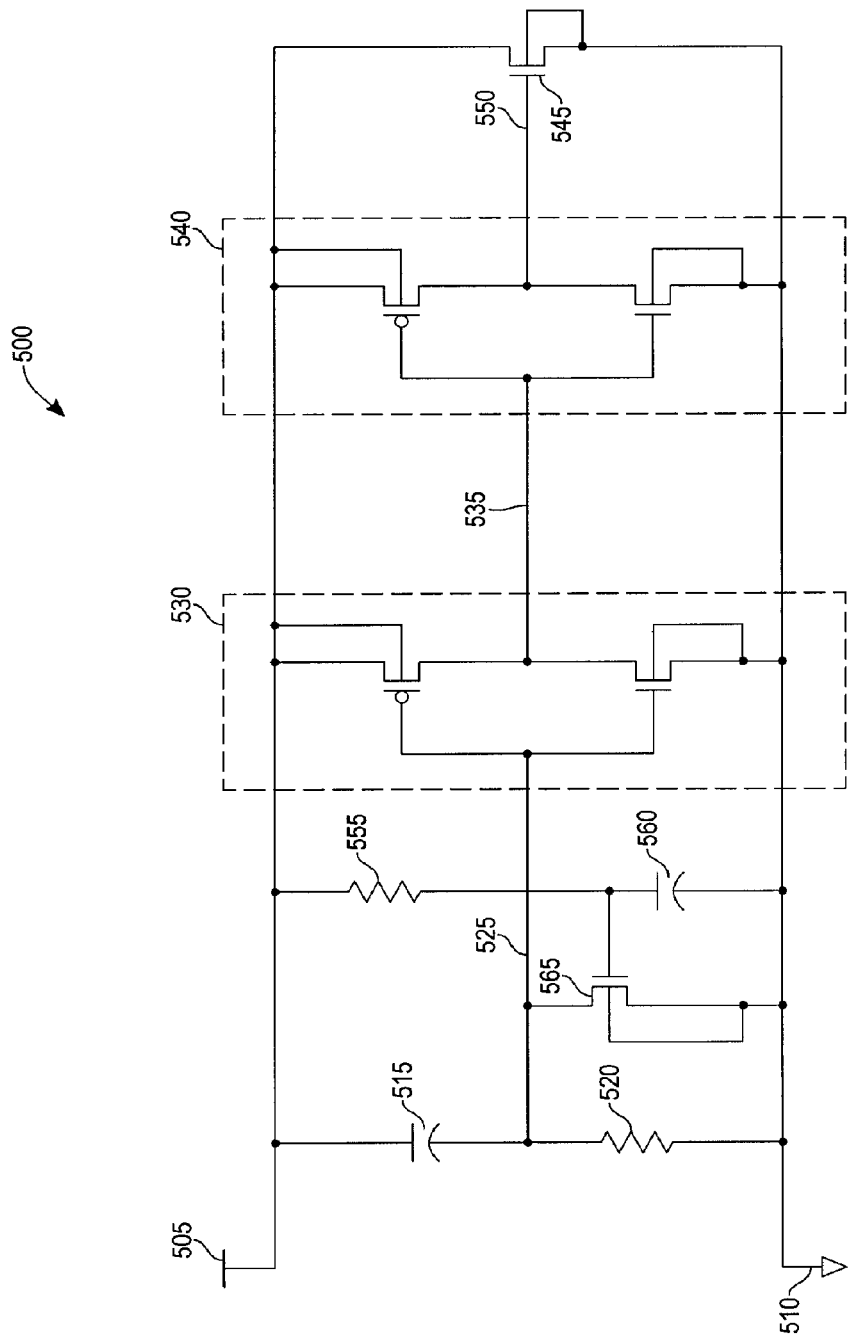
Fig._5

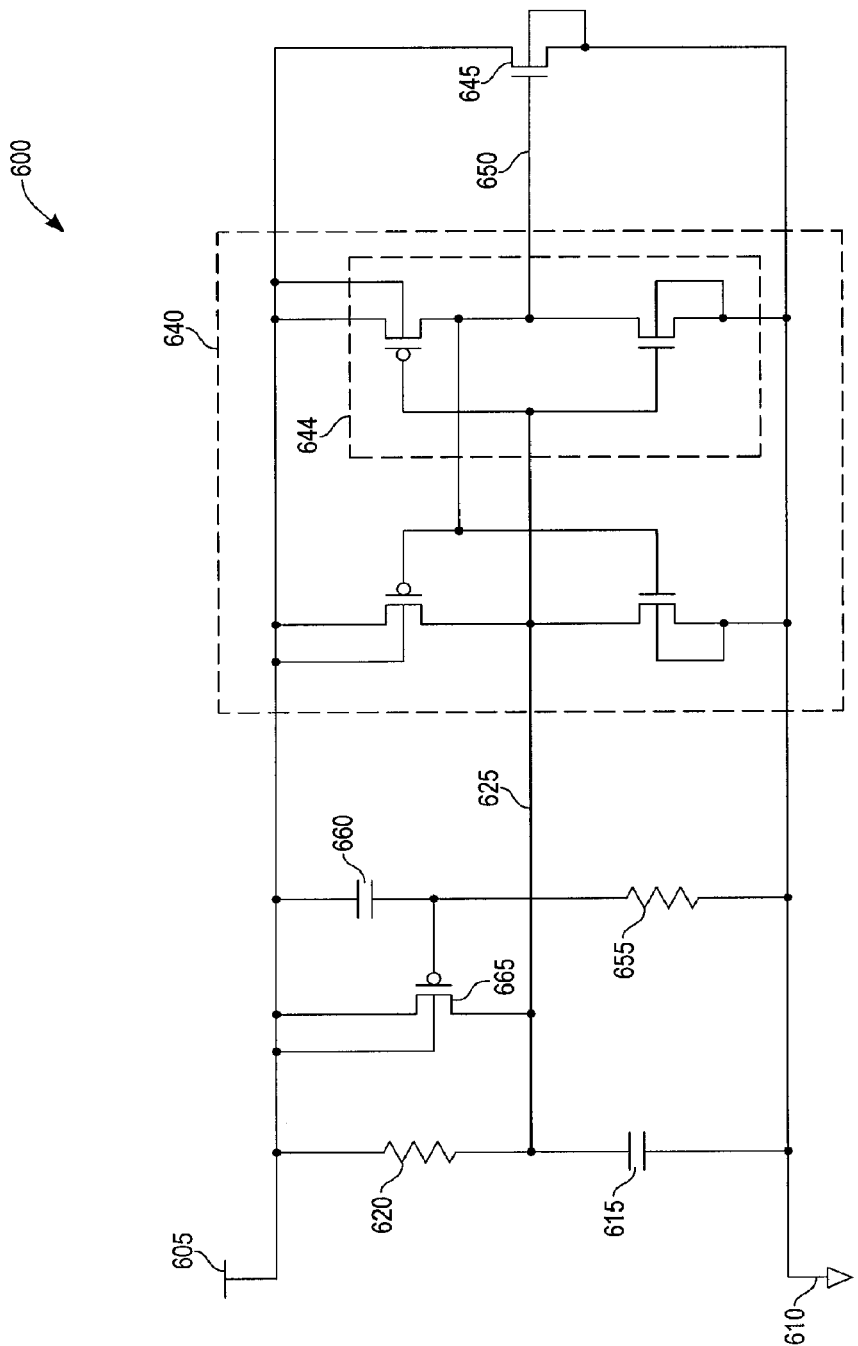
Fig._6

US 7,570,468 B2

NOISE IMMUNE RC TRIGGER FOR ESD PROTECTION

CROSS-REFERENCE TO RELATED APPLICATION

This application claims priority from U.S. provisional application No. 60/806,608, filed Jul. 5, 2006.

TECHNICAL FIELD

The invention generally relates to electrostatic discharge protection of integrated circuits. More specifically, the invention relates to an RC circuit with high noise immunity for triggering an ESD shunting device.

BACKGROUND ART

Electrostatic Discharge (ESD) protection is a critical problem for modern integrated circuits. With a low breakdown voltage of transistors in submicron processes, it is important to provide a method of protecting power supply pins from ESD damage, especially on smaller chips where there is no high capacitance available to absorb current from a discharge. On many circuits a method used to provide this protection is a shunt circuit that responds to a rapid rise of voltage on a power supply line by shunting a power supply line to ground during an ESD upset event.

It is possible to distinguish between an ESD event and a normal application of power by a difference in rise time. During an ESD event a rise time on a power supply line is in the range of 10 nanoseconds (ns), whereas a rise time during regular application of power to the supply line is in most of cases typically much greater than 1 microsecond (μs) but may be, in some extreme cases, in the range of hundreds of nanoseconds. However, in extreme cases during normal operation, when several outputs switch simultaneously, it is possible that a voltage drop due to noise (due to either an IR or RLC voltage drop) on a power supply line can reach a nanosecond time range and trigger a threshold voltage of some protective devices. Additionally, conventional ESD trigger circuits have a constraint that they also need to remain on for several microseconds to be effective during an ESD upset. In extremely noisy power supply situations, it is possible to generate a false triggering of a shunt circuit.

With reference to FIG. 1, a series configuration of a trigger capacitor 115 and a trigger resistor 120 connects between $V_{DD}$ 105 and ground 110 in a first prior art ESD shunt circuit 100. An ESD inverter 130 and a trigger inverter 140 each connect between $V_{DD}$ 105 and ground 110. An ESD trigger line 125 connects between a series connection node (between the trigger capacitor 115 and the trigger resistor 120) and an input of the ESD inverter 130. A trigger line 135 connects between an output of the ESD inverter 130 and an input of the trigger inverter 140. An ESD shunt device 145 connects between $V_{DD}$ 105 and ground 110. An ESD shunt trigger line 150 connects between an output of the trigger inverter 140 and an input of the ESD shunt device 145.

In FIG. 1, the first prior art ESD shunt circuit 100 makes use of an RC time constant produced by a series configuration of the trigger capacitor 115 and the trigger resistor 120. An RC time constant is selected away from (i.e., shorter than) a magnitude of a rise time expected on a power supply node $V_{DD}$ 105. However, a RC time constant should also be sufficiently long to provide full dissipation of a charge build up from an ESD event prior to turning off a shunt. A time required to discharge the ESD event is dependent on a time constant determined by a discharging network and a RC time constant of the trigger device. To be effective, a time constant must also be long enough to keep a shunt enabled for the duration of the ESD upset event. Using some typical values from a human body model (HBM) standard, 5000 volts (V), 100 picoFarads (pF), and 1500 Ohms produce the ESD upset event with a discharge time of approximately 1 microsecond being required to discharge a $V_{DD}$ 105 line to a level <5 V. Therefore, a value of an internal RC time constant would need to be >2 microseconds to ensure that the ESD shunt device 145 remains enabled for 1 microsecond. As previously stated, this time constant is long enough to be easily achieved by a noisy power bus or a rapid power on. Therefore, the first prior art ESD shunt circuit 100 sufferers from a sensitivity to noise on $V_{DD}$ 105, a requirement to be used in situations where a power-on voltage ramp rate is low, and the amount of area to provide the large RC time constant is large.

With reference to FIG. 2, a series configuration of a trigger capacitor 215 and a trigger resistor 220 connects between $V_{DD}$ 205 and ground 210 in a second prior art ESD shunt circuit 200. An ESD inverter 230 and a trigger latch 240 each connect between $V_{DD}$ 205 and ground 210. An ESD trigger line 225 connects between a series connection node (between the trigger capacitor 215 and the trigger resistor 220) and an input of the ESD inverter 230. A trigger line 235 connects between an output of the ESD inverter 230 and an input of the trigger latch 240. An ESD shunt device 245 connects between $V_{DD}$ 205 and ground 210. An ESD shunt trigger line 250 connects between an output of the trigger latch 240 and an input of the ESD shunt device 245.

The second ESD shunt circuit 200 also uses an RC time constant to trigger the ESD shunt device 245, but uses the trigger latch 240 to maintain a triggered state of the ESD shunt device 245. By separating the ESD trigger elements (i.e., the trigger capacitor 215, the trigger resistor 220, and the ESD inverter 230) from an element sustaining the ESD trigger state (i.e., the trigger latch 240), a RC time constant for triggering can be reduced by a factor of 100. The first benefit of a reduction in a RC time constant is the surface saved. Reduction of a RC time constant eliminates also risk of an accidental trigger during a rapid (in the range of hundreds of nanoseconds) power-on of a system. An additional benefit of a reduction in a RC time constant, is less risk of false triggering during switching, which produces noise (on a order of nanoseconds) on $V_{DD}$ 205, caused by simultaneously switching outputs (SSO).

Since the risk of false triggering is less but not eliminated, the second ESD shunt circuit 200 can require additional timeout circuitry (not shown) which produces a release of the trigger latch 240 after a few microseconds delay typically. A timeout circuit is required to release the trigger latch 240 in cases where false triggering has occurred due to RLC noise or IR drop caused by SSO.

SUMMARY

A present invention is a circuit that reduces an RC time constant of an ESD trigger element during normal operation, thus minimizing risk of a false triggering of an ESD protection circuit.

The present invention saves significant layout area by eliminating need of a timeout circuit associated with releasing a device maintaining a trigger state (i.e., a trigger latch). A layout area reduction is possible due to reducing the risk of false triggering due to RLC noise or IR drops caused by SSO.

The invention provides noise immune triggering elements to avoid activation of an ESD shunt device during normal powered-on operation. A RC time constant for triggering is set in an operational context according to conditions of usage. During normal operation, when a chip is powered, an ESD trigger resistor is shunted by an MOS device. The parallel combination of the ESD trigger resistor and the MOS device significantly lowers a resistive component of a first RC time constant and thus avoids triggering due to noise or SSO.

During fabrication, ESD tests, and handling, when a chip is not powered, an absence of power means a MOS shunting device is not on, allowing a regular RC time constant for ESD triggering to be available for protecting a device.

According to a first aspect, the invention relates to an ESD protection circuit comprising an ESD trigger network coupled between a power terminal and ground, the ESD trigger network responsive to an ESD event and further comprising a trigger capacitor coupled to a trigger resistor, at least one logic gate coupled to an output of the ESD trigger network, an ESD shunt device coupled to an output of the at least one logic gate, a shunt trigger network coupled between the power terminal and ground, the shunt trigger network further comprising a shunt resistor coupled to a shunt capacitor, and a shunt device coupled to the output of the ESD trigger network and in parallel with the trigger resistor, a control input of the shunt device coupled to an output of the shunt trigger network, whereby the ESD trigger network configured to trigger the ESD shunt device, thus shunting the power terminal to ground.

According to a second aspect, the invention relates to a An ESD protection circuit, disposed between a power terminal and a ground terminal, comprising an ESD trigger means for detecting an ESD event, the ESD trigger means coupled between the power terminal and the ground terminal, at least one logic gate means for triggering an ESD event detection state, the at least one logic gate means coupled to the ESD trigger means, an ESD shunt means for shunting current related to the ESD event, the ESD shunt means coupled to the at least one logic gate means, a shunt means for shunting an element of the ESD trigger means, the shunt means coupled to the ESD trigger means, and a shunt trigger means for triggering the shunt means, the shunt trigger means coupled to the shunt means and coupled between the power terminal and the ground terminal.

According to a third aspect, An ESD protection circuit comprising a first RC network coupled to a power terminal and ground, the first RC network further comprising a first capacitor coupled to a first resistor, the first RC network configured to produce a first RC time constant responsive to an ESD event, at least one logic gate coupled to an output of the ESD trigger network, an ESD shunt device coupled to the logic gate, a second RC network coupled to the power terminal and ground, the second RC network further comprising a second resistor coupled to a second capacitor and configured to produce a second RC time constant longer than the first RC time constant, and a shunt device coupled in parallel with the first resistor, the shunt device coupled to the second RC network, whereby the first RC network is configured to successively trigger the logic gate, and the ESD shunt device, the shunt device configured to be triggered to shunt the first resistor after the second RC time constant elapses.

The invention also relates to a method of triggering an ESD protection device disposed between a power terminal and a ground terminal, comprising ascertaining a first time period related to an expected ESD event, calculating a first RC time constant corresponding to the first time period, selecting a trigger capacitor and a trigger resistor to produce the first RC time constant, sensing an ESD event having an onset timeframe corresponding to the first time period, shunting current produced by the ESD event, ascertaining a second time period longer than the first time period, calculating a second RC time constant corresponding to the second time period, selecting a shunt resistor and a shunt capacitor to produce the second RC time constant; and shunting the trigger resistor.

BRIEF DESCRIPTION OF DRAWINGS

FIG. 1 is a schematic diagram of a first prior art ESD protection circuit for ESD protection.

FIG. 2 is a schematic diagram of a second prior art ESD protection circuit for ESD protection.

FIG. 3 is a schematic diagram of an exemplary ESD protection circuit according to the present invention.

FIG. 4 is an exemplary process flow diagram of a method for triggering protection from an ESD event utilizing the circuit of FIG. 3.

FIG. 5 is a schematic diagram of an exemplary ESD protection circuit according to the present invention.

FIG. 6 is a schematic diagram of an exemplary ESD protection circuit according to the present invention.

DETAILED DESCRIPTION

With reference to FIG. 3, a series configuration of a trigger capacitor 315 and a trigger resistor 320 connects between $V_{DD}$ 305 and ground 310 forming an ESD trigger network in an exemplary embodiment of an ESD protection circuit 300. An ESD inverter 330 and a trigger latch 340 each connect between $V_{DD}$ 305 and ground 310. An ESD trigger line 325 connects between a first series connection node (between the trigger capacitor 315 and trigger resistor 320) and an input of an ESD inverter 330. The ESD inverter 330 contains an inverter pullup device 332 in series with an inverter pulldown device 334 between VDD 305 and ground 310. The input of the ESD inverter 330 connects to a control input of both the inverter pullup device 332 and the inverter pulldown device 334. A trigger line 335 connects between an output of the ESD inverter 330 and an input of a trigger latch 340. An ESD shunt device 345 connects between $V_{DD}$ 305 and ground 310. An ESD shunt trigger line 350 connects between an output of a trigger latch 340 and an input of an ESD shunt device 345.

The trigger latch 340 contains a first latch pullup device 342 in series with a first latch pulldown device 344 between $V_{DD}$ 305 and ground 310. The trigger latch 340 also contains a second latch pullup device 346 in series with a second latch pulldown device 348 between $V_{DD}$ 305 and ground 310. The trigger line 335 connects to a control input of each of the first latch pullup device 342 and the first latch pulldown device 344 as well as the series connection node of the second latch pullup device 346 and the second latch pulldown device 348. The ESD shunt trigger line 350 connects to a control input of each of the second latch pullup device 346 and the second latch pulldown device 348 as well as a series connection node of the first latch pullup device 342 and the first latch pulldown device 344.

A series configuration of a shunt resistor 355 and a shunt capacitor 360 connects between $V_{DD}$ 305 and ground 310 forming a shunt trigger network. A shunt device 365 connects between the ESD trigger line 325 and ground 310 and thus shunts the trigger resistor 320. A second series connection node (between the shunt resistor 355 and the shunt capacitor 360) connects to a control input of the shunt device 365.

It would be clear to one of skill in the art that a complementary approach for implementing the ESD protection circuit 300 is possible. For instance, the shunt device 365 may be a PMOS transistor when connected between the ESD trigger line 325 and $V_{DD}$ 305. The complementary approach in this case would continue with a complementary connection of the trigger resistor 320 to $V_{DD}$ 305 and the trigger capacitor 315 connected to ground 310. Similarly, the shunt capacitor 360 would connect to $V_{DD}$ 305 and the shunt resistor 355 would connect to ground 310. In this case, to be responsive to a positive going ESD event, the ESD shunt device 345 would be a PMOS transistor. In addition, in the above complementary approach, an even number of logic inversions would be possible, for example, between the ESD trigger line 325 and the line 335, which would thus make it possible to keep an NMOS as the ESD shunt device 345.

In regard to understanding operation of the ESD protection circuit 300, the situations to consider are that the circuit is not powered and receives an ESD event, the circuit is in the process of powering up, or the circuit is powered and experiences noise or SSO. The ESD protection circuit 300 is intended for protection against ESD events only in a non-powered device and causes the ESD trigger network to be transparent to electrical activity with similar characteristics to an ESD event when the device is powered. The ESD protection circuit 300 is intended to be used in the event ESD protection is needed, for example, when the device containing the ESD protection circuit 300 is being transported or is involved in manufacturing processes. The ESD protection circuit 300 is not expected to play a significant role in ESD protection during powered-on operation where either an ESD risk does not exist or large capacitances (i.e., decoupling capacitors) are generally available at a system-level (i.e., outside of the integrated circuit) to shield an associated device in normal operation.

In a first case, an ESD upset event occurs to a non-powered circuit associated with the ESD protection circuit 300 and voltage on $V_{DD}$ 305 increases rapidly. It is desirable to have the ESD shunt device 345 triggered and maintained in a triggered state for the duration of the ESD event. Within the ESD event a rate of voltage change per unit time, or $$\frac{dv}{dt},$$

is high. An ESD event duration is on the order of 1 μs; but the onset of the ESD event is a fraction of the duration and ranges on the order of, for example, 10 ns, depending on the intrinsic capacitance within the integrated circuit. Current through the trigger capacitor 315 is given by $$i_{TC} = C_T \frac{dv}{dt},$$

where $C_T$ is a value of the trigger capacitor 315. $C_T$ is typically 1 pF. A high rate of $$\frac{dv}{dt}$$

means that sufficient current ($i_{TC}$) is provided through the trigger capacitor 315 and to the trigger resistor 320 to provide a trigger voltage (not shown) on the ESD trigger line 325 sufficient to activate the ESD inverter 330. For example, in a typical process technology with a source voltage of about 1 V, 0.3-0.5 V would be sufficient to activate the ESD inverter 330.

In a non-powered condition, a first RC time constant is produced by the trigger capacitor 315 in series with the trigger resistor 320. The first RC time constant is determined by a selection of component values for the trigger capacitor 315 and the trigger resistor 320 to provide an expected response time to ESD upset events. The first RC time constant is selected to correspond to the expected time of the onset of the ESD event which, for example, is 10 ns. The operation of the first RC time constant need not serve any additional constraint or purpose, such as the RC time constant corresponding to the trigger capacitor 115 and trigger resistor 120 (FIG. 1) does in the prior art. In the prior art (FIG. 1) a single time constant may be involved in both a trigger response and maintenance of the response for a duration of the ESD event. In this way, the first RC time constant of the ESD protection circuits 200 and 300 may attain a value reduced by a factor of 100, compared to that of the prior art circuit 100.

A second RC time constant is produced by the series configuration of the shunt resistor 355 and the shunt capacitor 360. The second RC time constant is selected to be greater than the first RC time constant and is sufficient in length to not allow triggering of the shunt device 365 by the onset of the ESD event. The length of the second RC time constant assures that there is not sufficient voltage developed on the second series connection node (between the shunt resistor 355 and the shunt capacitor 360) to trigger the control input and turn on the shunt device 365 during the onset of the ESD event. For example, if the time range of the onset of ESD is 10 ns, then the second RC time constant will be selected to be greater than 20 ns. In this way, the first RC time constant is maintained with the values of the trigger capacitor 315 in series with the trigger resistor 320 determining the first RC time constant during the onset of the ESD event. In other words, the on-channel resistance of the shunt device 365 is not in parallel with the trigger resistor 320 during the onset of the ESD event.

With the ESD event producing sufficient current through the trigger capacitor 315, the resulting trigger voltage on the ESD trigger line 325 produces a low voltage on the trigger line 335 at an output of the ESD inverter 330. Voltage from the ESD event, applied to $V_{DD}$ 305, is sufficient to support logic operation of the ESD inverter 330 and the trigger latch 340 circuit elements during the upset event. For example, if typical power supply voltage level is 1 volt (V), an ESD event occurring to a non-powered device will easily generate several volts and therefore will supply an operating voltage for the ESD inverter 330 and the trigger latch 340 circuit elements. A low voltage on the trigger line 335 sets the trigger latch 340 and produces a high voltage level on the ESD shunt trigger line 350. A high voltage level on the ESD shunt trigger line 350 turns on the ESD shunt device 345 causing $V_{DD}$ 305 to be shunted to ground 310. The integrated circuit associated with the ESD protection circuit 300 is protected by a conductive path, through the ESD shunt device 345, from damage due to high voltage produced by the current of the ESD event. Up to this point the behavior and operation of the present invention are the same as would be experienced from the second ESD shunt circuit 200 for a similar ESD event.

After the ESD event has triggered the trigger latch 340 and a period of time equal to the second RC time constant has elapsed, the voltage on the second series connection node does provide sufficient voltage to turn on the shunt device 365. The ESD trigger line 325 is discharged to ground across the parallel combination of the trigger resistor 320 and the on-channel resistance of the shunt device 365. A low-level voltage is produced on the ESD trigger line 325.

The low-level voltage on the ESD trigger line 325 does not produce a high-level voltage on the trigger line 335 at the output of the ESD inverter 330. The low-level voltage on the ESD trigger line 325 activates the inverter pullup device 332 which tries to pull up the trigger line 335. The inverter pullup device 332 is overpowered by the second latch pulldown device 348. A control input gate of the second latch pulldown device 348 is supplied by a high-level logic signal on the ESD shunt trigger line 350 due to the previous triggering of the trigger latch 340. With the second latch pulldown device 348 active, a low-level voltage on the trigger line 335 is maintained.

The transistor devices in the ESD inverter 330 and the trigger latch 340 are designed with device dimensions that produce asymmetrical current gains in certain pullup devices compared to certain pulldown devices. Current gains designed in this way cause a switching threshold of the trigger latch 340 to favor the triggered state and not allow the ESD inverter 330 to reset the trigger latch 340. For example, the device geometries of the second latch pulldown device 348 produce a greater current gain than the current gain produced by the device geometries of the inverter pullup device 332. In this way, the onset of a low-voltage level on the ESD trigger line 325 is kept from resetting the trigger latch 340, producing a low level voltage on the ESD shunt trigger line 350, and turning off the ESD shunt device 345. Once triggered by the onset of an ESD event, the trigger latch 340 remains set producing a high level voltage on the ESD shunt trigger line 350 and maintains ESD protection through the ESD shunt device 345. A similar situation occurs with the circuit 200 in which the trigger line 225 comes also back to a low voltage level before the end of the ESD event duration, in spite of the absence of an on-channel transistor in parallel with the resistor 220.

In a second operational situation, a circuit associated with the ESD protection circuit 300 is powering up. The ramp-up voltage on $V_{DD}$ 305 is at a slower rate (i.e., a lower $$\frac{dv}{dt},$$

on the order of 100 ns) than an ESD event and is consequently not detected by the trigger capacitor 315 and trigger resistor 320 elements which produce the first RC time constant. No trigger voltage is developed on the ESD trigger line 325 and no shunting through the ESD shunt device 345 occurs. Due to a long RC time constant of the trigger capacitor 115 and trigger resistor 120 (FIG. 1), the first ESD shunt circuit 100 of the prior art may trigger at the microsecond ramp-up rate. The ESD protection circuit 300 and the second ESD shunt circuit 200 are immune to false triggering at the same or faster ramp-up rates. In the second operational situation, supplied with the same power-up characteristics, the present invention behaves the same as the second ESD shunt circuit 200. To address ramp-up rates faster than 100 ns, both the second ESD shunt circuit 200 and the ESD protection circuit 300 require additional circuitry (not shown) to release the trigger latch 340. The additional circuitry is required since the powering-up process causes an undesired triggering of the trigger latch 340 at this ramp-up rate.

In a third situation, where an integrated circuit associated with the ESD protection circuit 300 is powered up and in normal operation, it is desirable that the ESD shunt device 345 not be triggered in the event of voltage fluctuations on $V_{DD}$ 305 due to SSO or noise. With the ESD protection circuit 300 powered up, the shunt resistor 355 provides a high-level-voltage bias to the control input of the shunt device 365. The high-voltage level on the control input turns on the shunt device 365 and shunts the ESD trigger line 325 and the trigger resistor 320 to ground 310. An on-channel resistance of the shunt device 365 is in parallel with the trigger resistor 320 and thus forms a third RC time constant.

In the case of a voltage fluctuation on $V_{DD}$ 305 due to SSO or noise occurring to the powered circuit associated with the ESD protection circuit 300, voltage on $V_{DD}$ 305 varies about the nominal value with both positive and negative excursions in voltage. A $$\frac{dv}{dt}$$

rate of change for the positive voltage fluctuations may be on the order of 10 ns. This rate of $$\frac{dv}{dt}$$

means that insufficient current ($i_{TC}$) is provided through the trigger capacitor 315 to the parallel combination of the trigger resistor 320 and the on-channel resistance of the shunt device 365 to provide a trigger voltage on the ESD trigger line 325. Consequently, the ESD inverter 330 is not activated.

By comparison, under the same noise conditions, the second ESD shunt circuit 200 also turns on, leading to a large consumption of current by the circuit. As a result, additional circuitry is required to release the trigger latch 240 in order to recover from the triggering and regain a normal rate of current consumption. Normalcy in the rate of current consumption is possible since the ESD shunt devise 245 is turned off by the resetting action of the additional circuitry. Beyond the need for the additional circuitry, the functionality and reliability can be affected by such a consumption of current, which is besides, not acceptable according to applications.

With values of the trigger capacitor 315 and the trigger resistor 320 selected to produce the first and third RC time constants (for an appropriate response to an expected ESD upset event) and with values of the shunt resistor 355 and the shunt capacitor 360 selected to produce the second RC time constant longer than an expected onset of the ESD event, the ESD protection circuit 300 is triggered appropriately to protect an associated integrated circuit. Additionally, the protective shunting state of the ESD protection circuit 300 is achieved without additional release circuitry and without any additional circuit area that the release circuitry would require if incorporated.

With reference to FIG. 4, an exemplary embodiment of a method for triggering protection from an ESD event, according to the present invention, commences with ascertaining 405 a first time period encompassing the time range of an expected ESD event. The method continues with calculating 410 a first RC time constant corresponding to the first time period and selecting 415 a trigger capacitor and a trigger resistor to produce the first RC time constant. For example, in a present day semiconductor fabrication process, with a standard human body model set of parameters of 5000 volts, 100 picofarads, and 1500 ohms, an expected range of the response time required for the RC time constant would be on the order of 10 nanoseconds. Next, a step of sensing 420 an ESD event having an onset timeframe corresponding to the first time period is taken followed by shunting 425 current produced by the ESD event with a shunting means triggered by the sensing of the ESD event.

The method continues with ascertaining 430 a second time period longer than the first time period, followed next by calculating 435 a second RC time constant corresponding to the second time period. The second RC time constant is selected to be greater than the expected duration of the onset of the ESD event to ensure that the shunt device 365 (FIG. 3) is not activated until after the trigger latch 340 is set. For example, the second RC time constant may be selected to be greater than two times the expected time range of the onset of the typical ESD event. The method concludes with selecting 440 a shunt resistor and a shunt capacitor to produce the second RC time constant. In this way an ESD event is appropriately recognized and responded to, including providing for the shunting of ESD induced current of the potentially harmful event.

With reference to FIG. 5, a series configuration of a trigger capacitor 515 and a trigger resistor 520 connects between $V_{DD}$ 505 and ground 510 forming an ESD trigger network in an exemplary ESD protection circuit 500. An ESD inverter 530 and a trigger inverter 540 each connect between $V_{DD}$ 505 and ground 510. An ESD trigger line 525 connects between a series connection node (between the trigger capacitor 515 and the trigger resistor 520) and an input of the ESD inverter 530. A trigger line 535 connects between an output of the ESD inverter 530 and an input of the trigger inverter 540. The ESD inverter 530 or the trigger inverter 540 may be, for example, a CMOS inverter with a PMOS pull-up device and an NMOS pull-down device. An ESD shunt device 545 connects between $V_{DD}$ 505 and ground 510. An ESD shunt trigger line 550 connects between an output of the trigger inverter 540 and an input of the ESD shunt device 545.

A series configuration of a shunt resistor 555 and a shunt capacitor 560 connects between $V_{DD}$ 505 and ground 510 forming a shunt trigger network. A shunt device 565 connects between the ESD trigger line 525 and ground 510 and thus shunts the trigger resistor 520. A second series connection node (between the shunt resistor 555 and the shunt capacitor 560) connects to a control input of the shunt device 565.

With continuing reference to FIG. 5, the exemplary ESD protection circuit 500 makes use of an RC time constant produced by a series configuration of the trigger capacitor 515 and the trigger resistor 520. An RC time constant is selected away from and shorter than a magnitude of a rise time expected on a power supply node $V_{DD}$ 505. However, a RC time constant is also sufficiently long (for an example see discussion below) to provide full dissipation of a charge build up from an ESD event prior to turning off the ESD shunt device 545. A time constant, determined by a discharging network and a RC time constant of the trigger device, corresponds to a time required to discharge the ESD event.

In regard to understanding operation of the ESD protection circuit 500, the situations to consider are that the circuit is not powered and receives an ESD event, the circuit is in the process of powering up, or the circuit is powered and experiences noise or SSO.

In a first case, an ESD upset event occurs to a non-powered circuit associated with the ESD protection circuit 500 and voltage on $V_{DD}$ 505 increases rapidly. It is desirable to have the ESD shunt device 545 triggered and maintained in a triggered state for the duration of the ESD event. The duration of an ESD event is on the order of 1 μs; but the onset of the ESD event is a fraction of the duration and ranges on the order of, for example, 10 ns, depending on the intrinsic capacitance within the integrated circuit. Current through the trigger capacitor 515 is given by $$i_{TC} = C_T \frac{dv}{dt},$$

where $C_T$ is a value of the trigger capacitor 515. $C_T$ is typically 1 pF. A high rate of $$\frac{dv}{dt}$$

means that sufficient current ($i_{TC}$) is provided through the trigger capacitor 515 and to the trigger resistor 520 to provide a trigger voltage (not shown) on the ESD trigger line 525 sufficient to activate the ESD inverter 530. An exemplary trigger voltage may be, for example, 1 volt for typical processes.

In a non-powered condition, a first RC time constant is produced by the trigger capacitor 515 in series with the trigger resistor 520. The first RC time constant is determined by a selection of component values for the trigger capacitor 515 and the trigger resistor 520 to provide an expected response time to ESD upset events. The first RC time constant is selected to correspond to the expected time of the duration of the ESD event which, for example, is 1 microsecond. In this unlatched embodiment, the first RC time is used to trigger the ESD shunt device 545 and to hold it in an on state during the whole ESD event duration.

The operation of the first RC time constant need not serve any additional constraint or purpose, such as the RC time constant corresponding to the trigger capacitor 115 and trigger resistor 120 (FIG. 1) does in the prior art. In the prior art a single time constant may be involved in timing both a trigger response and maintaining the response for the duration of the ESD event.

A second RC time constant is produced by the series configuration of the shunt resistor 555 and the shunt capacitor 560. The second RC time constant is selected to be greater than the first RC time constant and is sufficient in length to not allow triggering of the shunt device 565 by the duration of the ESD event. The length of the second RC time constant assures that there is not sufficient voltage developed on the second series connection node (between the shunt resistor 555 and the shunt capacitor 560) to trigger the control input and turn on the shunt device 565 during the duration of the ESD event. For example, if the time range of the duration of ESD is 1 microsecond, then the second RC time constant will be selected to be greater than 2 microseconds. In this way, the first RC time constant is maintained with the values of the trigger capacitor 515 in series with the trigger resistor 520 determining the first RC time constant during the duration of the ESD event. In other words, the on-channel resistance of the shunt device 565 is not in parallel with the trigger resistor 520 during the duration of the ESD event.

With the ESD event producing sufficient current through the trigger capacitor 515, the resulting trigger voltage on the ESD trigger line 525 produces a low voltage on the trigger line 535 at an output of the ESD inverter 530. For example, an ESD event producing current through the trigger capacitor to generate about 0.5V the ESD trigger line 525 produces the low voltage response on the trigger line 535. Voltage from the ESD event, applied to $V_{DD}$ 505, is sufficient to support logic operation of the ESD inverter 530 and the trigger inverter 540 circuit elements during the upset event. For example, if typical power supply voltage level is 1 volt (V), an ESD event occurring to a non-powered device will easily generate several volts and therefore will supply an operating voltage for the ESD inverter 530 and the inverter 540 circuit elements. A low voltage on the trigger line 535 is applied to the trigger inverter 540 and produces a high voltage level on the ESD shunt trigger line 550. A high voltage level on the ESD shunt trigger line 550 turns on the ESD shunt device 545 causing $V_{DD}$ 505 to be shunted to ground 510. The integrated circuit associated with the ESD protection circuit 500 is protected by a conductive path, through the ESD shunt device 545, from damage due to high voltage produced by the current of the ESD event. Up to this point the behavior and operation of the present invention are the same as would be experienced from the first ESD shunt circuit 100 for a similar ESD event.

After the ESD event has triggered the trigger inverter 540 and a period of time equal to the second RC time constant has elapsed, the voltage on the second series connection node could provide sufficient voltage to turn on the shunt device 565 but this voltage is not available since the voltage produced by the ESD stress has been totally dissipated.

In a second operational situation, a circuit associated with the ESD protection circuit 500 is powering up. The ramp-up voltage on $V_{DD}$ 505 is at a slower rate (i.e., a lower $$\frac{dv}{dt},$$

on the order of 10 microseconds) than an ESD event and is consequently not detected by the trigger capacitor 515 and trigger resistor 520 elements which produce the first RC time constant. No trigger voltage is developed on the ESD trigger line 525 and no shunting through the ESD shunt device 545 occurs. Due to a long RC time constant of the trigger capacitor 115 and trigger resistor 120 (FIG. 1), the first ESD shunt circuit 100 of the prior art may trigger at the microsecond ramp-up rate. Due to a long RC time constant of the trigger capacitor 515 and trigger resistor 520 (FIG. 5), the ESD protection circuit 500 may trigger too at the same ramp-up rates.

In a third situation, where an integrated circuit associated with the ESD protection circuit 500 is powered up and in normal operation, it is desirable that the ESD shunt device 545 not be triggered in the event of voltage fluctuations on $V_{DD}$ 505 due to SSO or noise. With the ESD protection circuit 500 powered up, the shunt resistor 555 provides a high-level-voltage bias to the control input of the shunt device 565. The high-voltage level on the control input turns on the shunt device 565 and shunts the ESD trigger line 525 and the trigger resistor 520 to ground 510. An on-channel resistance of the shunt device 565 is in parallel with the trigger resistor 520 and thus forms a third RC time constant.

In the case of a voltage fluctuation on $V_{DD}$ 505 due to SSO or noise occurring to the powered circuit associated with the ESD protection circuit 500, voltage on $V_{DD}$ 505 varies about the nominal value with both positive and negative excursions in voltage. A $$\frac{dv}{dt}$$

rate of change for the positive voltage fluctuations may be on the order of 10 ns. This rate of $$\frac{dv}{dt}$$

means that insufficient current ($i_{TC}$) is provided through the trigger capacitor 515 to the parallel combination of the trigger resistor 520 and the on-channel resistance of the shunt device 565 to provide a trigger voltage on the ESD trigger line 525. Consequently, the ESD inverter 530 is not activated.

With values of the trigger capacitor 515 and the trigger resistor 520 selected to produce the first and third RC time constants (for an appropriate response to an expected ESD upset event) and with values of the shunt resistor 555 and the shunt capacitor 560 selected to produce the second RC time constant longer than an expected duration of the ESD event, the ESD protection circuit 500 is triggered appropriately to protect an associated integrated circuit.

It would be clear to one of skill in the art that a complementary approach for implementing the ESD protection circuit 500 is possible. For instance, the shunt device 565 may be a PMOS transistor when connected between the ESD trigger line 525 and $V_{DD}$ 505. The complementary approach in this case would continue with a complementary connection of the trigger resistor 520 to $V_{DD}$ 505 and the trigger capacitor 515 connected to ground 510. Similarly, the shunt capacitor 560 would connect to $V_{DD}$ 505 and the shunt resistor 555 would connect to ground 510. In this case, to be responsive to a positive going ESD event, the ESD shunt device 545 would be a PMOS transistor. In addition, in the above complementary approach, an odd number of logic inversions would be possible, for example, between the ESD trigger line 525 and the input of the ESD shunt device 545. In this case, to be responsive to a positive going ESD event, the ESD shunt device 545 would be a NMOS transistor.

With reference to FIG. 6, a series configuration of a trigger capacitor 615 and a trigger resistor 620 connects between $V_{DD}$ 605 and ground 610 in an exemplary embodiment of an ESD protection circuit 600. A trigger latch 640 connects between $V_{DD}$ 605 and ground 610. An ESD trigger line 625 connects between a first series connection node (between the trigger capacitor 615 and trigger resistor 620) and an input of the trigger latch 640. The trigger latch 640 contains a latch output inverter 644 containing a pullup device in series with a pulldown device between $V_{DD}$ 605 and ground 610. An ESD shunt device 645 connects between $V_{DD}$ 605 and ground 610. An ESD shunt trigger line 650 connects between an output of the trigger latch 640 and an input of the ESD shunt device 645. An output node of the latch output inverter 644 connects to the ESD shunt trigger line 650 and provides an output of the trigger latch 640.

A series configuration of a shunt resistor 655 and a shunt capacitor 660 connects between $V_{DD}$ 605 and ground 610. A shunt device 665 connects between the ESD trigger line 625 and $V_{DD}$ 605 and thus shunts the trigger resistor 620. A second series connection node (between the shunt resistor 655 and the shunt capacitor 660) connects to a control input of the shunt device 665.

In the present exemplary embodiment the trigger resistor 620 is connected to $V_{DD}$ 605 and the trigger capacitor 615 is connected to ground 610. The shunt capacitor 660 connects to $V_{DD}$ 605 and the shunt resistor 655 connects to ground 610. The shunt device 665 is a PMOS transistor connecting between $V_{DD}$ 605 and the ESD trigger line 625 with a gate input connected to the second series connection node. The ESD shunt device 645 is a NMOS transistor connecting between $V_{DD}$ 605 and ground 610.

It would be clear to one of skill in the art that a complementary approach for implementing the ESD protection circuit 600 is possible. For instance, the shunt device 665 may be an NMOS transistor when connected between the ESD trigger line 625 and ground 610. The complementary approach in this case would continue with a complementary connection of the trigger resistor 620 to ground 610 and the trigger capacitor 615 connected to $V_{DD}$ 605. Similarly, the shunt capacitor 660 would connect to ground 610 and the shunt resistor 655 would connect to $V_{DD}$ 605. In this case, to be responsive to a positive going ESD event, the ESD shunt device 645 would be an PMOS transistor.

In addition, in the embodiment of FIG. 6 wherein the trigger resistor 620 is connected to $V_{DD}$ 605 and the trigger capacitor 615 is connected to ground 610, the ESD shunt device 645 may also be an NMOS transistor if, in addition to the latch 640, an even number of logic inversions is added between the ESD trigger line 625 and the ESD shunt trigger line 650. It is noted that, in such a configuration, the latch 640 itself is an inverter, such that an odd number of inverters is provided between the ESD trigger line 525 and the ESD shunt trigger line 650. In this configuration, the NMOS ESD shunt device is responsive to a positive going ESD event.

In certain situations, the present invention may not be effective in protecting against ESD events. This is the case for instance, during normal powered-on operation, where ESD protection external to the integrated circuit (i.e., such as large decoupling capacitors at the system-level) are not available. This is a result of the ESD protection within the integrated circuit being disabled when the integrated circuit is powered on.

In a foregoing specification, a present invention has been described with reference to specific embodiments thereof. It will, however, be evident to a skilled artisan that various modifications and changes can be made thereto without departing from a broader spirit and scope of an invention as set forth in the appended claims.

What is claimed is:

1. An ESD protection circuit comprising:
   an ESD trigger network coupled between a power terminal and ground, the ESD trigger network responsive to an ESD event and further comprising a trigger capacitor coupled to a trigger resistor;
   at least one logic gate coupled to an output of the ESD trigger network;
   an ESD shunt device coupled to an output of the at least one logic gate;
   a shunt trigger network coupled between the power terminal and ground, the shunt trigger network further comprising a shunt resistor coupled to a shunt capacitor;
   a shunt device coupled to the output of the ESD trigger network and in parallel with the trigger resistor, a control input of the shunt device coupled to an output of the shunt trigger network;
   wherein the ESD trigger network is configured to trigger the ESD shunt device, thus shunting the power terminal to ground; and
   wherein an RC time constant of the ESD trigger network is configured to be significantly reduced by the shunt device shunting the trigger resistor, the shunt device shunting when activated by the circuit having power applied.

2. The circuit of claim 1, wherein the RC time constant of the ESD trigger network is configured to be significantly less than an expected rate of voltage fluctuation on the power terminal due to noise or simultaneous switching outputs produced by an associated device, the ESD trigger network being non-responsive to the noise or simultaneous switching of outputs.

3. The circuit of claim 1, wherein the at least one logic gate is comprised of a latch configured to retain an indication of an ESD event being triggered.

4. The circuit of claim 3, wherein the ESD trigger network is configured to have a nominal RC time constant with the shunt device non-operational, the nominal RC time constant selected to correspond with an expected time range of an onset of the ESD event, the shunt device non-operational with no power applied to the circuit.

5. The circuit of claim 3, wherein a first RC time constant, associated with the ESD trigger network, corresponds with over-voltage characteristics related to an onset of the ESD event during a non-powered condition of the ESD protection circuit, the first RC time constant determined by the trigger capacitor in series with the trigger resistor.

6. The circuit of claim 3, wherein a second RC time constant associated with the shunt trigger network is selected to be longer than an expected period of time corresponding with an onset of the ESD event, the second RC time constant determined by the shunt trigger resistor in series with the shunt trigger capacitor.

7. The circuit of claim 6, wherein the second RC time constant is selected to be about twice as long as an expected period of time corresponding with the onset of the ESD event.

8. The circuit of claim 1, wherein the ESD trigger network is configured to have a nominal RC time constant with the shunt device non-operational, the nominal RC time constant selected to correspond with an expected time range of a duration of the ESD event, the shunt device non-operational with no power applied to the circuit.

9. The circuit of claim 1, wherein a first RC time constant, associated with the ESD trigger network, corresponds with over-voltage characteristics related to a duration of the ESD event during a non-powered condition of the ESD protection circuit, the first RC time constant determined by the trigger capacitor in series with the trigger resistor.

10. The circuit of claim 1, wherein a second RC time constant associated with the shunt trigger network is selected to be longer than an expected period of time corresponding to the ESD event duration, the second RC time constant determined by the shunt trigger resistor in series with the shunt trigger capacitor.

11. The circuit of claim 10, wherein the second RC time constant is selected to be about twice as long as an expected period of time corresponding to the ESD event duration.

12. The circuit of claim 1, wherein the trigger capacitor connects between the power terminal and the trigger resistor, the at least one logic gate comprising an odd number of inverters, the ESD shunt device being a PMOS transistor.

13. The circuit of claim 1, wherein the trigger capacitor connects between the power terminal and the trigger resistor, the at least one logic gate comprising an even number of inverters, the ESD shunt device being a NMOS transistor.

14. The circuit of claim 1, wherein the trigger resistor connects between the power terminal and the trigger capacitor, the at least one logic gate comprising an even number of inverters, the ESD shunt device being a PMOS transistor.

15. The circuit of claim 1, wherein the trigger resistor connects between the power terminal and the trigger capacitor, the at least one logic gate comprising an odd number of inverters, the ESD shunt device being a NMOS transistor.

16. An ESD protection circuit, disposed between a power terminal and a ground terminal, comprising:
an ESD trigger means for detecting an ESD event, the ESD trigger means coupled between the power terminal and the ground terminal;
at least one logic gate means for triggering an ESD event detection state, the at least one logic gate means coupled to the ESD trigger means;
an ESD shunt means for shunting current related to the ESD event, the ESD shunt means coupled to the at least one logic gate means;
a shunt means for shunting an element of the ESD trigger means, the shunt means coupled to the ESD trigger means; and
a shunt trigger means for triggering the shunt means, the shunt trigger means coupled to the shunt means and coupled between the power terminal and the ground terminal
wherein an RC time constant of the ESD trigger means is configured to be reduced by the shunt means shunting the element of the ESD trigger means, the shunt means shunting when activated by the ESD protection circuit having power applied.

17. The ESD protection circuit of claim 16, wherein one of the at least one logic gate means is a latching means for retaining the ESD event detection state.

18. An ESD protection circuit comprising:
a first RC network coupled to a power terminal and ground, the first RC network further comprising a first capacitor coupled to a first resistor, the first RC network configured to produce a first RC time constant responsive to an ESD event;
at least one logic gate coupled to an output of the first RC network;
an ESD shunt device coupled to the logic gate;
a second RC network coupled to the power terminal and ground, the second RC network further comprising a second resistor coupled to a second capacitor and configured to produce a second RC time constant longer than the first RC time constant; and
a shunt device coupled in parallel with the first resistor, the shunt device coupled to the second RC network;
whereby the first RC network is configured to successively trigger the at least one logic gate and the ESD shunt device, the shunt device configured to be triggered to shunt the first resistor after the second RC time constant elapses.

19. The circuit of claim 18, wherein an RC time constant of the ESD protection circuit is configured to be significantly reduced by the shunt device shunting the trigger resistor, the shunt device shunting when activated by the circuit having power applied.

20. The circuit of claim 18, wherein the RC time constant of the ESD protection circuit is configured to be significantly less than an expected rate of voltage fluctuation on the power terminal due to noise or simultaneous switching outputs produced by an associated device, the ESD protection circuit being non-responsive to the noise or simultaneous switching of outputs.

21. The circuit of claim 18, wherein the ESD protection circuit is configured to have a nominal RC time constant with the shunt device non-operational, the nominal RC time constant selected to correspond with an expected time range of a duration of the ESD event, the shunt device non-operational with no power applied to the circuit.

22. The circuit of claim 18, wherein the first RC time constant, associated with the ESD protection circuit, corresponds with over-voltage characteristics related to a duration of the ESD event during a non-powered condition of the ESD protection circuit, the first RC time constant determined by the trigger capacitor in series with the trigger resistor.

23. The circuit of claim 18, wherein the second RC time constant associated with the shunt trigger network is selected to be about twice as long as an expected period of time corresponding with an ESD event duration, the second RC time constant determined by the shunt trigger resistor in series with the shunt trigger capacitor.

24. The ESD protection circuit of claim 18, wherein the logic gate is a latch.

25. The circuit of claim 24, wherein the ESD protection circuit is configured to have a nominal RC time constant with the shunt device non-operational, the nominal RC time constant selected to correspond with an expected time range of an onset of the ESD event, the shunt device non-operational with no power applied to the circuit.

26. The circuit of claim 24, wherein a first RC time constant, associated with the ESD event during a non-powered condition of the ESD protection circuit, the first RC time constant determined by the trigger capacitor in series with the trigger resistor.

27. The circuit of claim 24, wherein a second RC time constant associated with the shunt trigger network is selected to be longer than an expected period of time corresponding with an onset of the ESD event, the second RC time constant determined by the shunt trigger resistor in series with the shunt trigger capacitor.

28. The circuit of claim 18, wherein the trigger capacitor connects between the power terminal and the trigger resistor, the ESD shunt device being a NMOS transistor.

29. The circuit of claim 18, wherein the trigger resistor connects between the power terminal and the trigger capacitor, the ESD shunt device being a PMOS transistor.

30. A method of triggering an ESD protection device disposed between a power terminal and a ground terminal, comprising:
ascertaining a first time period related to an expected ESD event;
calculating a first RC time constant corresponding to the first time period;
selecting a trigger capacitor and a trigger resistor to produce the first RC time constant;
sensing an ESD event having an onset timeframe corresponding to the first time period;
shunting current produced by the ESD event;
ascertaining a second time period longer than the first time period;
calculating a second RC time constant corresponding to the second time period;
selecting a shunt resistor and a shunt capacitor to produce the second RC time constant; and shunting the trigger resistor when the ESD protection device has power applied.

31. The method of triggering an ESD protection device of claim 30, wherein the second time period is selected to be about twice the first time period.

32. The method of triggering an ESD protection device of claim 30, wherein the first time period corresponds to an onset of the ESD event.

33. The method of triggering an ESD protection device of claim 30, wherein the first time period corresponds to a duration of the ESD event.

34. An ESD protection circuit comprising:
  an ESD trigger network coupled between a power terminal and ground, the ESD trigger network responsive to an ESD event and further comprising a trigger capacitor coupled to a trigger resistor;
  at least one logic gate coupled to an output of the ESD trigger network;
  an ESD shunt device coupled to an output of the at least one logic gate;
  a shunt trigger network coupled between the power terminal and ground and comprising a shunt resistor coupled to a shunt capacitor;
  a shunt device coupled to the output of the ESD trigger network and in parallel with the trigger resistor, a control input of the shunt device coupled to an output of the shunt trigger network;
  wherein the ESD trigger network is configured to trigger the ESD shunt device, thus shunting the power terminal to ground; and
  wherein the ESD trigger network is configured to have a nominal RC time constant with the shunt device non-operational, the nominal RC time constant selected to correspond with an expected time range of an onset of the ESD event, the shunt device being non-operational with no power applied to the circuit.

35. The circuit of claim 34, wherein the logic gate comprises a latch to retain an indication of a triggered ESD event.

36. The circuit of claim 34, wherein a first RC time constant, associated with the ESD trigger network, corresponds with over-voltage characteristics related to an onset of the ESD event during a non-powered condition of the ESD protection circuit, the first RC time constant determined by the trigger capacitor in series with the trigger resistor.

37. The circuit of claim 36, wherein a second RC time constant associated with the shunt trigger network is selected to be longer than an expected period of time corresponding with an onset of the ESD event, the second RC time constant determined by the shunt trigger resistor in series with the shunt trigger capacitor.

38. An ESD protection circuit comprising:
  an ESD trigger network coupled between a power terminal and ground, the ESD trigger network responsive to an ESD event and comprising a trigger capacitor coupled to a trigger resistor;
  at least one logic gate coupled to an output of the ESD trigger network;
  an ESD shunt device coupled to an output of the at least one logic gate;
  a shunt trigger network coupled between the power terminal and ground and comprising a shunt resistor coupled to a shunt capacitor;
  a shunt device coupled to the output of the ESD trigger network and in parallel with the trigger resistor, a control input of the shunt device coupled to an output of the shunt trigger network;
  wherein the ESD trigger network is configured to trigger the ESD shunt device, thus shunting the power terminal to ground; and
  wherein an RC time constant associated with the shunt trigger network is selected to be longer than an expected period of time corresponding with an onset of the ESD event, the RC time constant determined by the shunt trigger resistor in series with the shunt trigger capacitor.

39. The circuit of claim 38, wherein the RC time constant is selected to be about twice as long as an expected period of time corresponding with the onset of the ESD event.

40. The circuit of claim 39, wherein the ESD trigger network is configured to have a nominal RC time constant with the shunt device non-operational, the nominal RC time constant selected to correspond with an expected time range of a duration of the ESD event, the shunt device being non-operational with no power applied to the circuit.

41. The circuit of claim 38, wherein the RC time constant corresponds with over-voltage characteristics related to a duration of the ESD event during a non-powered condition of the ESD protection circuit, the RC time constant is set by the trigger capacitor in series with the trigger resistor.

* * * * *

UNITED STATES PATENT AND TRADEMARK OFFICE
CERTIFICATE OF CORRECTION

PATENT NO. : 7,570,468 B2
APPLICATION NO. : 11/759337
DATED : August 4, 2009
INVENTOR(S) : David Bernard et al.

It is certified that error appears in the above-identified patent and that said Letters Patent is hereby corrected as shown below:

In column 16, line 26, in Claim 26, after "ESD" insert -- protection circuit, corresponds with over-voltage characteristics related to an onset of the ESD --.

In column 16, lines 59-61, in Claim 30, delete "shunting the trigger resistor when the ESD protection device has power applied." and insert the same on Col. 16, Claim 30, line 60 with a new tab.

Signed and Sealed this

Sixteenth Day of February, 2010

David J. Kappos
*Director of the United States Patent and Trademark Office*